Patented Aug. 8, 1939

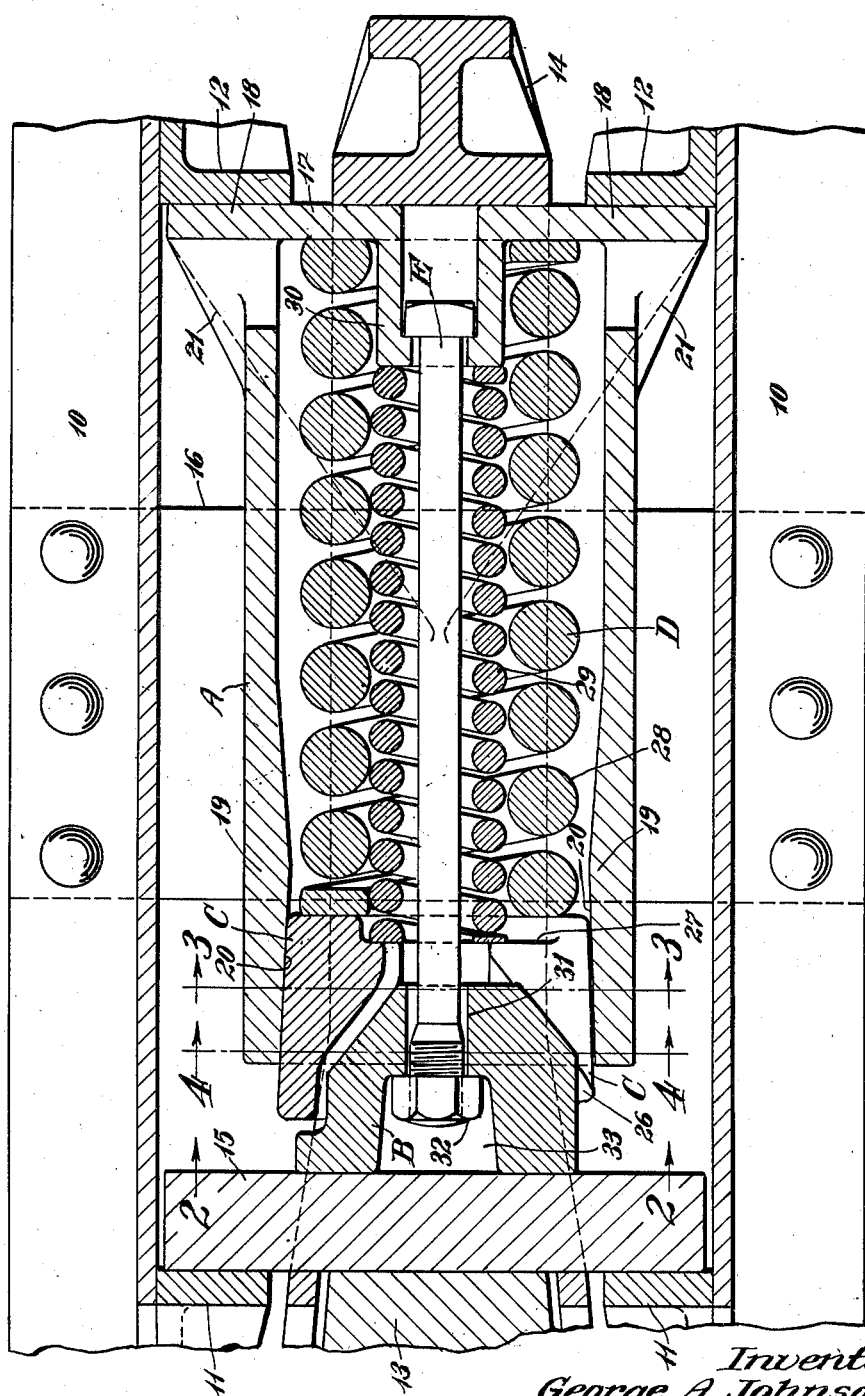

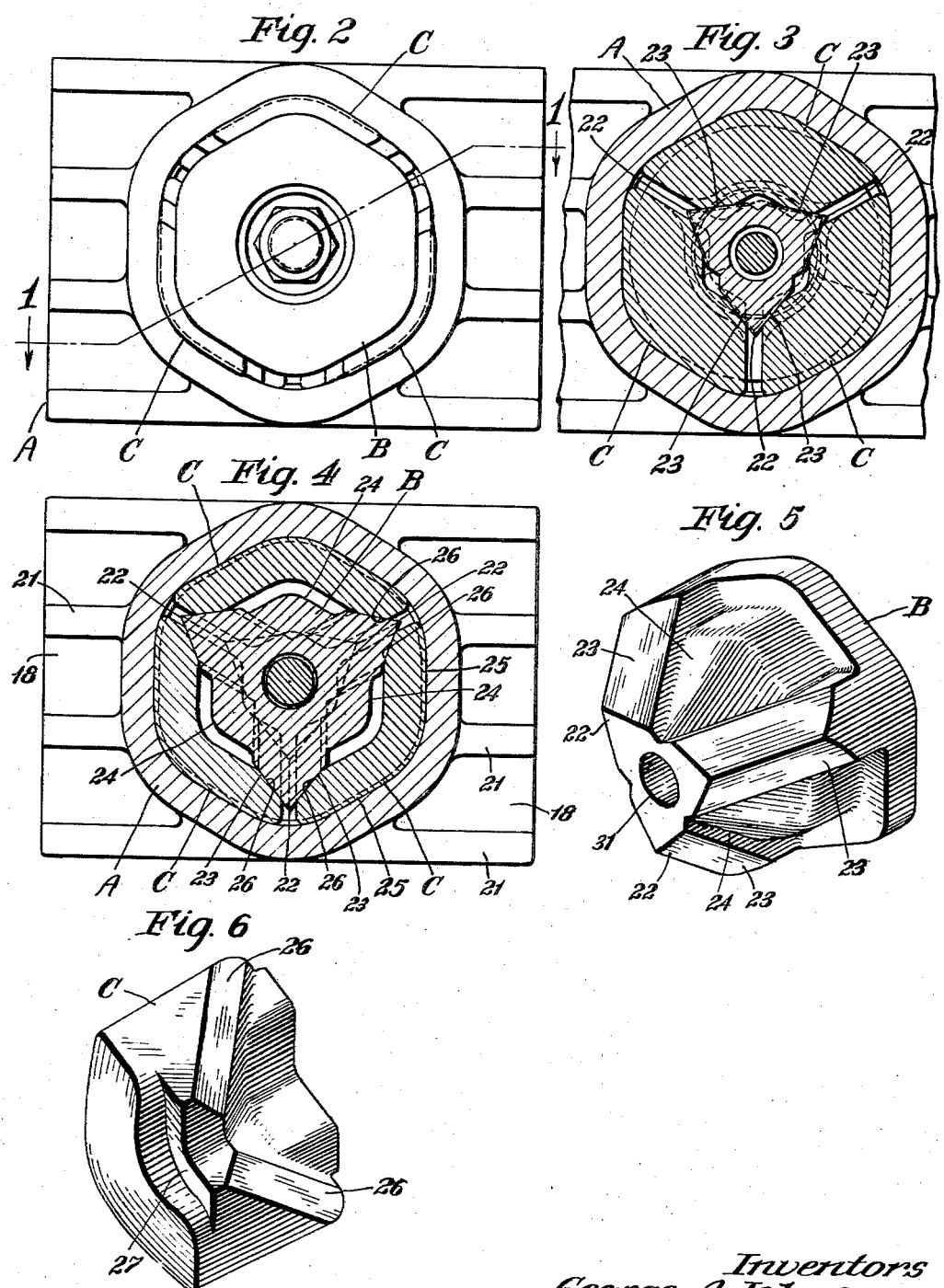

2,168,408

UNITED STATES PATENT OFFICE 2,168,408

FRICTION SHOCK-ABSORBING MECHANISM

George A. Johnson, Chicago, and Stacy B. Haseltine, Glen Ellyn, Ill., assignors to W. H. Miner, Inc., Chicago, Ill., a corporation of Delaware Application April 2, 1936, Serial No. 72,248

5 Claims. (Cl. 213—32)

This invention relates to improvements in friction shock absorbing mechanisms.

One object of the invention is to provide a simple and efficient friction shock absorbing mechanism, especially adapted for railway draft riggings, having exceptionally high capacity combined with easy release.

A more specific object of the invention is to provide a friction shock absorbing mechanism including a friction casing, cooperating spring resisted friction shoes, and wedge means for forcing the shoes into tight frictional engagement with the friction surfaces of the casing, wherein the wedge means is in the form of a pressure transmitting member having wedge projections engaging between adjacent shoes provided with wedge faces so arranged as to produce a combined wedging action forcing the shoes outwardly away from the central longitudinal axis of the casing and at the same time spreading adjacent shoes apart, thus properly distributing the spreading forces on the shoes to produce maximum frictional capacity without sacrificing easy releasing action of the mechanism.

Other objects of the invention will more clearly appear from the description and claims hereinafter following:

In the drawings forming a part of this specification, Figure 1 is a horizontal sectional view through the underframe structure of a railway car, illustrating the improved friction shock absorbing mechanism in connection therewith, the section through said mechanism corresponding to the line 1—1 of Figure 2. Figure 2 is a front elevational view of the friction shock absorbing mechanism illustrated in Figure 1, looking in the direction of the arrows 2—2 of Figure 1. Figures 3 and 4 are transverse, vertical, sectional views, corresponding respectively to the lines 3—3 and 4—4 of Figure 1, the underframe structure of the car and the draft yoke being omitted in these views. Figure 5 is a detail perspective view of a certain wedge member. Figure 6 is a detail perspective view of a friction shoe of the improved mechanism.

In said drawings, 10—10 indicate channel-shaped center or draft sills of a railway car underframe structure, to the inner sides of which are secured front and rear stop lugs 11—11 and 12—12. The inner end of the usual coupler shank is indicated by 13 and a hooded yoke 14 of well-known form is operatively connected to said shank. The improved shock absorbing mechanism proper and a front follower 15 are disposed within the yoke 14 and the yoke is supported by a saddle plate 16 secured to the bottom flanges of the draft sills 10—10.

The improved friction shock absorbing mechanism proper comprises broadly a friction casing A; a wedge member B; three friction shoes C—C—C; a spring resistance D; and a retainer bolt E.

The friction casing A is in the form of a shell of hexagonal cross section, open at the front end and closed by a vertical transverse wall 17 at the rear end. The wall 17 is extended laterally outwardly beyond the sides of the casing A, thereby presenting flanges 18—18 which cooperate with the rear stop lugs 12—12 in the manner of the usual rear follower. At the forward end of the casing A, the walls thereof are thickened, as indicated at 19. The casing is provided with interior flat friction surfaces 20—20 formed on the inner sides of said thickened wall portions 19—19. The casing thus presents six interior friction surfaces which are arranged symmetrically about the central longitudinal axis of the casing. As shown in Figure 1, these friction surfaces are preferably converged inwardly of the casing, thereby providing a tapered friction shell section. The flanges 18—18 at the rear end of the casing A are preferably reenforced by webs 21—21 formed integral with said flanges and the side walls of the casing.

The wedge member B is in the form of a block having a transverse front end face bearing on the inner side of the front follower 15. The block B is provided with three radial wedge portions 22—22—22 arranged symmetrically about the longitudinal axis of the mechanism and extending lengthwise of the block. The wedge portions 22—22—22 converge inwardly of the mechanism and each portion is provided with two longitudinally extending, flat, wedge faces 23—23 at an angle to each other, thus providing a wedge projection of substantially V-shaped cross section. Between the wedge portions 22—22—22, the block B is cut away as indicated at 24—24—24, thereby providing relatively heavy projecting rib members which define the wedge portions 22—22—22. As will be seen, the wedge block B is thus provided with three radially projecting ribs which present three spaced, longitudinally extending, wedge projections of V-shaped cross section, converging inwardly of the mechanism and extending from the front portion to the rear end of the block.

The friction shoes are three in number and are arranged symmetrically about the longitudinal axis of the mechanism. Each shoe C is provided with a V-shaped outer friction surface 25 engaging with two adjacent friction surfaces 20—20 of the casing A, and correspondingly inclined to said friction surfaces 20—20. The three shoes C—C—C are circumferentially spaced with respect to each other, as clearly shown in Figures 2, 3, and 4, and each shoe is provided with a pair of flat wedge faces 26—26. The wedge faces 26—26 of each shoe C are respectively disposed at opposite side edges of said shoe. The V-shaped wedge projections of the three wedge portions 22—22—22 of the block B engage between the shoes C—C—C, the wedge faces 23—23 of each wedge projection 22 cooperating with and engaging the wedge faces 26—26 of two adjacent shoes, the engaged wedge faces 26—26 of said adjacent shoes being angularly disposed with respect to each other to correspond with the V-shaped cross section of the wedge projection and being inclined to the longitudinal axis of the mechanism to correspond with the inclination of the faces 23—23 of the cooperating wedge projection 22. As most clearly shown in Figures 1 and 6, each shoe is laterally, inwardly enlarged at the rear end and said enlarged portion is provided with an inset seat 27 which forms a spring abutment.

The spring resistance D comprises a heavy outer coil 28 and a relatively lighter inner coil 29 arranged within the casing A. The outer coil spring 28 bears at its front end on the inner ends of the shoes C—C—C and has its rear end bearing on the end wall 17 of the casing A. A hollow, inwardly projecting, boss 30 on the rear wall 17 of the casing engages within the rear portion of the coil 28 and holds the latter centered. The inner coil 29 of the spring resistance D is seated on the boss 30 and has its front end bearing on the seats 27—27—27 of the shoes C—C—C.

The retainer bolt E is anchored at the rear end to the boss 30 and has the shank thereof extending through the coil spring 29 and an opening 31 in the wedge block B. The wedge block B is anchored to the bolt E, the bolt being provided with a nut 32 at its forward end seated in a pocket 33 of the wedge block and having shouldered engagement with the block to limit outward movement of the latter. The bolt E serves to hold the mechanism assembled and maintain uniform overall length thereof. The bolt E is preferably so adjusted as to maintain the parts under a predetermined initial compression.

The operation of the improved friction shock absorbing mechanism is as follows: During a draft action of the railway draft rigging, the yoke 14 is pulled outwardly by the coupler 13 of the car, thereby pulling the casing outwardly therewith and compressing the mechanism against the front follower 15 which, at this time, is held stationary by the fixed front stop lugs 11—11. The wedge B is thus forced to move inwardly of the casing A. During a buffing action, the coupler 13 is moved inwardly, carrying the front follower 15 rearwardly therewith and compressing the friction shock absorbing mechanism against the rear stop lugs 12—12, the friction casing A being held stationary at this time by engagement of the flanges 18—18 thereof with the rear stop lugs 12—12. Inward movement of the wedge B during compression of the mechanism in either draft or buff sets up a wedging action between the wedge B and the shoes C—C—C and carries the latter inwardly of the casing against the resistance of the springs 28 and 29. Inasmuch as the wedge projections of the wedge members 22—22—22 of the block B are of V-shaped cross section and engage between the shoes, the faces 23—23, 23—23, and 23—23 of said projections will wedge the shoes apart circumferentially while a radial spreading or wedging action is also exerted on said shoes due to the V-shaped projections of the wedge members 22—22—22 and the faces 23—23—23 of said V-shaped projections being inclined to the longitudinal axis of the mechanism. Relatively high frictional resistance is thus produced between the friction surfaces of the shoes C—C—C and the casing A. This frictional resistance is further augmented due to the taper of the friction shell section of the casing, the shoes being forced laterally inwardly toward the longitudinal axis of the mechanism during their inward movement on the friction surfaces 20—20 of the casing A, thereby squeezing the wedge B outwardly relatively to the friction shoes C—C—C, slippage occurring on the cooperating wedge faces 23 and 26 of the wedge block B and the shoes. Inward movement of the wedge block B is limited by engagement of the follower 15 with the outer end of the casing A, thereby preventing undue compression of the spring resistance D. Upon reduction of the actuating force, the pressure on the wedge is relieved, thereby releasing the latter from wedging engagement with the shoes and permitting outward movement of the shoes and wedge due to the expansive action of the spring resistance D. Restoration of the parts to normal fully released position is thus effected, outward movement of the wedge being finally limited by the retainer bolt E.

From the preceding description taken in connection with the drawings, it will be evident that by providing the arrangement of cooperating wedge faces on the wedge and shoes as herein disclosed, circumferential separation and radial outward spreading of the shoes is simultaneously effected, thereby assuring intimate frictional contact between the friction surfaces of the shoes and the friction casing, thus producing exceptionally high frictional capacity for the angularity of the wedge faces employed.

It is further pointed out that by combining this type of wedge acting means with a hexagonal friction casing or shell and cooperating V-shaped friction shoes, the V-shaped surfaces of the shoes are squeezed tightly into the V-shaped sections of the shell formed by adjacent friction surfaces of the latter without subjecting the casing to excessive strains, the wedging pressure of the wedge on the shoes being localized at the opposite side edges of adjacent shoes to exert an equalizing pressure on the casing walls adjacent to said outer side edges of the shoes and remote from the zone of contact of the apex portions of the V-shaped surfaces of said shoes with the casing walls to counteract forces tending to distort the casing in the vicinity of said zone of contact.

It is further pointed out that the shoes are held against rocking with respect to the wedge means by each shoe being securely held in position by contact with the wedge at spaced zones located at opposite side edges of said shoe.

We have herein shown and described what we now consider the preferred manner of carrying out our invention, but the same is merely illustrative and we contemplate all changes and modifications that come within the scope of the claims appended hereto.

We claim:

1. In a friction shock absorbing mechanism, the combination with a casing having a friction shell section provided with opposed interior friction surfaces of a plurality of friction shoes having sliding frictional engagement respectively with the friction surfaces of the casing; means reacting between the casing and the inner ends of the shoes yieldingly resisting movement of said shoes inwardly of the casing; and central wedge means having laterally, outwardly converging, wedge faces inclined lengthwise of the mechanism with respect to said friction surfaces and engaged between adjacent shoes for wedging said adjacent shoes apart and radially outwardly with respect to the longitudinal axis of the mechanism.

2. In a friction shock absorbing mechanism, the combination with a casing having interior friction surfaces arranged symmetrically about the longitudinal axis of the mechanism; of a plurality of friction shoes also arranged symmetrically about said axis and having sliding engagement with said friction surfaces; means yieldingly opposing inward movement of said shoes; and wedge means having a plurality of sets of wedge faces, the faces of each set converging laterally outwardly of the mechanism, said sets of faces extending lengthwise of the mechanism and converging inwardly thereof toward the central longitudinal axis of the mechanism, the faces of each set engaging between adjacent shoes for wedging the same radially outwardly with respect to said axis and spreading the same apart laterally.

3. In a friction shock absorbing mechanism, the combination with a casing having interior friction surfaces; of a plurality of friction shoes having sliding frictional engagement with the friction surfaces of the casing; means yieldingly resisting movement of said shoes inwardly of the casing; and a pressure transmitting wedge member having radial wedge projections engaging between adjacent shoes, said shoes and projections having sets of cooperating laterally outwardly converging wedge faces, each of said sets of faces being inclined inwardly toward the axis of the mechanism.

4. In a friction shock absorbing mechanism, the combination with a casing having interior friction surfaces; of a plurality of friction shoes having sliding frictional engagement with the friction surfaces of the casing; means yieldingly resisting movement of said shoes inwardly of the casing; and a pressure transmitting member having radially projecting wedging portions engaging between adjacent shoes, each of said wedging portions having a pair of wedge faces thereon, disposed at an angle to each other, converging outwardly radially and extending lengthwise of the mechanism, said wedge projections being inclined inwardly toward the longitudinal axis of said mechanism and said shoes having wedge faces along their side edges cooperating with the wedge faces of said wedge projections.

5. In a friction shock absorbing mechanism, the combination with a casing of angular cross section having a plurality of longitudinally extending, interior, flat friction surfaces, adjacent surfaces being disposed at an angle to each other; of a plurality of V-shaped friction shoes, each shoe having sliding frictional engagement with adjacent surfaces of said casing; means reacting between the casing and the inner ends of the shoes yieldingly resisting movement of said shoes inwardly of the casing; and central wedge means having laterally, outwardly converging wedge faces inclined lengthwise of the mechanism with respect to said friction surfaces and engaged between adjacent shoes for wedging said adjacent shoes apart and radially outwardly with respect to the longitudinal axis of the mechanism.

GEORGE A. JOHNSON.
STACY B. HASELTINE.